(12) United States Patent  
Sato

(10) Patent No.: US 6,600,876 B2
(45) Date of Patent: Jul. 29, 2003

(54) PHOTOGRAPHING APPARATUS WITH SHAKE DETECTION FUNCTION

(75) Inventor: Tatsuya Sato, Iruma (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/993,118

(22) Filed: Nov. 14, 2001

(65) Prior Publication Data

US 2002/0061189 A1 May 23, 2002

(30) Foreign Application Priority Data

Nov. 20, 2000 (JP) .......................................... 2000-353144

(51) Int. Cl.[7] .............................. G03B 17/00; G03B 7/26
(52) U.S. Cl. ............................................. 396/55; 396/303
(58) Field of Search ............................... 396/52, 53, 54, 396/55, 301, 302, 303

(56) References Cited

U.S. PATENT DOCUMENTS 5,682,556 A * 10/1997 Iwane et al. ................ 396/206
5,708,863 A * 1/1998 Satoh et al. .................. 396/52
5,794,081 A 8/1998 Itoh et al. ..................... 396/55

* cited by examiner

Primary Examiner—Russell Adams
Assistant Examiner—Arthur A Smith
(74) Attorney, Agent, or Firm—Straub & Pokotylo; John C. Pokotylo

(57) ABSTRACT

This invention provides a photographing apparatus with a shake detection function that can instantaneously execute shake detection operation while suppressing current consumption in non-use. More specifically, the photographing apparatus with the shake detection function according to this invention is characterized in that a standby shift determination unit changes, in accordance with the photographing mode state set by a photographing mode setting unit, a time used to determine whether to shift the photographing apparatus to a low-power consumption mode.

14 Claims, 13 Drawing Sheets

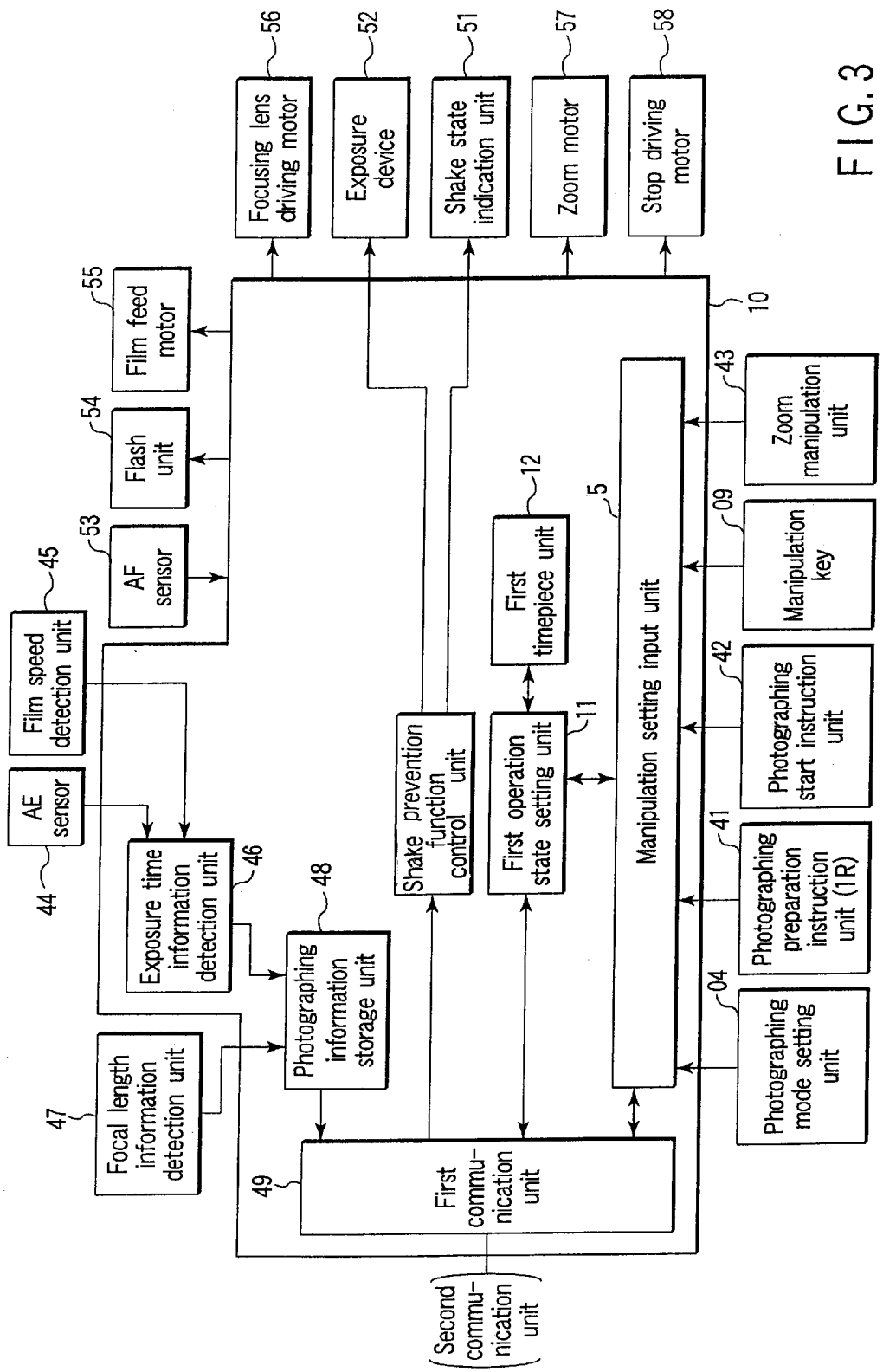
F I G. 3

Δt: Exposure start permission determination time
T: Exposure start permission timing

PHOTOGRAPHING APPARATUS WITH SHAKE DETECTION FUNCTION

CROSS REFERENCE TO RELATED APPLICATIONS

This application is based upon and claims the benefit of priority from the prior Japanese Patent Application No. 2000-353144, filed Nov. 20, 2000, the entire contents of which are incorporated herein by reference.

BACKGROUND OF THE INVENTION

1. Field of the Invention

The present invention relates to a photographing apparatus with a shake detection function that detects the camera shake state of a camera, performs level indication (display) of the shake state in accordance with the detection result, and starts photographing operation (exposure operation) in a small camera shake state, thus suppressing the influence of the shake.

2. Description of the Related Art

Various techniques for a photographing apparatus with a shake detection function that detects a camera shake state in photographing and reduces the influence of the camera shake have conventionally been disclosed.

For example, U.S. Pat. No. 5,794,081 discloses a photographing apparatus that executes shake detection/correction control by a shake CPU different from the main CPU, and inhibits the shift of the shake CPU and a shake sensor to a standby state when a shake correction mode is selected. By this processing, the technique enables regular use of a shake detection sensor output that requires certain time until it stabilizes after activation. This technique copes with, e.g., press down of the release button of a camera at one fling.

In the prior art, however, the photographing apparatus does not shift to the standby state. Even while the apparatus is not used, it keeps consuming a current of about several ten mA as long as the power SW of the camera is ON. To prevent such power consumption, the power SW must be frequently turned on/off, resulting in cumbersome manipulation.

To avoid current consumption of the photographing apparatus, it may also be conceivable to shift the shake system (shake CPU) to the standby state (STOP state) at the same time as the shift of a camera system other than the shake system to the standby state.

In this case, however, a shake sensor output cannot be managed, i.e., the shake state cannot be grasped. When a predetermined operation is to be done next under the control of the shake CPU, a long time is required to stabilize the shake detection sensor and shake detection system. This poses problems such that the use of the photographing apparatus cannot be quickly started.

BRIEF SUMMARY OF THE INVENTION

The present invention has been made to overcome the conventional drawbacks, and has as its object to provide a photographing apparatus with a shake detection function that can instantaneously execute shake detection operation while suppressing current consumption in non-use.

According to a first aspect of the invention, in order to achieve the above object, there is provided a photographing apparatus with a shake detection function, comprising a shake detection sensor configured to detect a shake state of the photographing apparatus, a shake detection control unit configured to control shake detection operation in the shake detection sensor, a shake prevention function unit configured to prevent a shake of the photographing apparatus on the basis of a control output from the shake detection control unit, a photographing mode setting unit configured to set a first photographing mode that uses a function of the shake prevention function unit and a second photographing mode that does not use the function of the shake prevention function unit, a manipulation unit which is manipulated by a user of the photographing apparatus, a timepiece unit configured to measure a time elapsed after the manipulation unit is manipulated, and a standby shift unit configured to shift the photographing apparatus to a low-power consumption state on the basis of a timepiece output from the timepiece unit, the standby shift unit changing a time until shift to the low-power consumption state in accordance with a photographing mode set by the photographing mode setting unit.

According to a second aspect of the invention, there is provided a photographing apparatus with a shake detection function, comprising a shake detection sensor configured to detect a shake state of the photographing apparatus, a shake state determination unit configured to determine the shake state of the photographing apparatus on the basis of an output from the shake detection sensor, a manipulation unit which is manipulated by a user of the photographing apparatus, a timepiece unit configured to measure a time elapsed after the manipulation unit is manipulated, and a standby shift unit configured to shift the photographing apparatus to a low-power consumption mode on the basis of a timepiece output from the timepiece unit, the standby shift unit changing a time until shift of the photographing apparatus to the low-power consumption mode in accordance with a determination result of the shake state determination unit.

According to a third aspect of the invention, there is provided a photographing apparatus with a shake detection function, comprising shake detection unit for detecting a shake state of the photographing apparatus, shake prevention unit for preventing a shake of the photographing apparatus on the basis of an output from the shake detection unit, photographing mode setting unit for setting a first photographing mode in which the shake prevention unit is operated, and a second photographing mode in which the shake prevention unit is not operated, manipulation unit for being manipulated by a user of the photographing apparatus, and standby shift unit for shifting the photographing apparatus to a low-power consumption mode a predetermined time after the manipulation unit is manipulated, wherein the predetermined time is changed in accordance with a photographing mode set by the photographing mode setting unit, and a time in the first photographing mode is longer than a time in the second photographing mode.

According to a fourth aspect of the invention, there is provided a photographing apparatus with a shake detection function, comprising a shake detection sensor for detecting a shake state of the photographing apparatus, shake detection control unit for controlling shake detection operation in the shake detection sensor, shake prevention unit for preventing a shake of the photographing apparatus on the basis of a control output from the shake detection control unit, photographing apparatus control unit for controlling the whole photographing apparatus, photographing mode setting unit for setting a photographing mode in which photographing operation using a function of the shake prevention unit is performed, a manipulation key for being manipulated to perform photographing operation in the photographing apparatus, manipulation setting input unit, incorporated in the photographing apparatus control unit, for receiving inputs from the photographing mode setting unit and the manipulation key, first timepiece unit, incorporated in the photographing apparatus control unit, for measuring a time elapsed after input manipulation via the manipulation setting input unit, first operation state setting unit, incorporated in the photographing apparatus control unit, for determining whether to shift the photographing apparatus to a low-power consumption mode on the basis of manipulation setting information from the manipulation setting input unit and a timepiece output from the first timepiece unit, second operation state setting unit, incorporated in the shake detection control unit, for determining an operation state of the shake detection control unit on the basis of an instruction from the first operation state setting unit, and second timepiece unit, incorporated in the shake detection control unit, for measuring a time after the second operation state setting unit receives the instruction from the first operation state setting unit, wherein the first operation state setting unit determines whether to shift the photographing apparatus control unit to the low-power consumption mode on the basis of a timepiece result of the first timepiece unit, and the second operation state setting unit determines whether to shift the shake detection control unit to the low-power consumption mode on the basis of a timepiece result of the second timepiece unit.

According to a fifth aspect of the invention, there is provided a photographing apparatus with a shake detection function, comprising a shake detection sensor for detecting a shake state of the photographing apparatus, shake detection control unit for controlling shake detection operation in the shake detection sensor, shake prevention unit for preventing a shake of the photographing apparatus on the basis of a control output from the shake detection control unit, photographing apparatus control unit for controlling the whole photographing apparatus, photographing mode setting unit for setting a photographing mode in which photographing operation using a function of the shake prevention unit is performed, a manipulation key for being manipulated to perform photographing operation in the photographing apparatus, manipulation setting input unit, incorporated in the photographing apparatus control unit, for receiving inputs from the photographing mode setting unit and the manipulation key, first timepiece unit, incorporated in the photographing apparatus control unit, for measuring a time elapsed after input manipulation via the manipulation setting input unit, first operation state setting unit, incorporated in the photographing apparatus control unit, for determining whether to shift the photographing apparatus to a low-power consumption mode on the basis of manipulation setting information from the manipulation setting input unit and a timepiece output from the first timepiece unit, second operation state setting unit, incorporated in the shake detection control unit, for determining an operation state of the shake detection control unit on the basis of an instruction from the first operation state setting unit, and second timepiece unit, incorporated in the shake detection control unit, for measuring a time after the second operation state setting unit receives the instruction from the first operation state setting unit, wherein the first operation state setting unit determines whether to shift the photographing apparatus control unit to the low-power consumption mode on the basis of a timepiece result of the first timepiece unit, and the second operation state setting unit determines whether to stop the shake detection sensor on the basis of a timepiece result of the second timepiece unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a block diagram showing the peripheral arrangement of an MCPU 10 in the photographing apparatus with the shake detection function according to the first embodiment;

DETAILED DESCRIPTION OF THE INVENTION

Embodiments of the present invention will be described below with reference to the several views of the accompanying drawing.

Figure 1A:
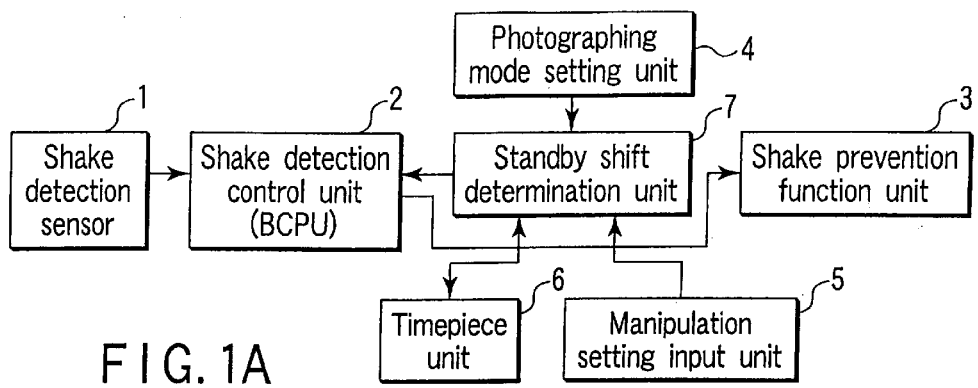
FIG. 1A is a block diagram showing the concept of a photographing apparatus with a shake detection function according to the present invention.
Figure 1B:
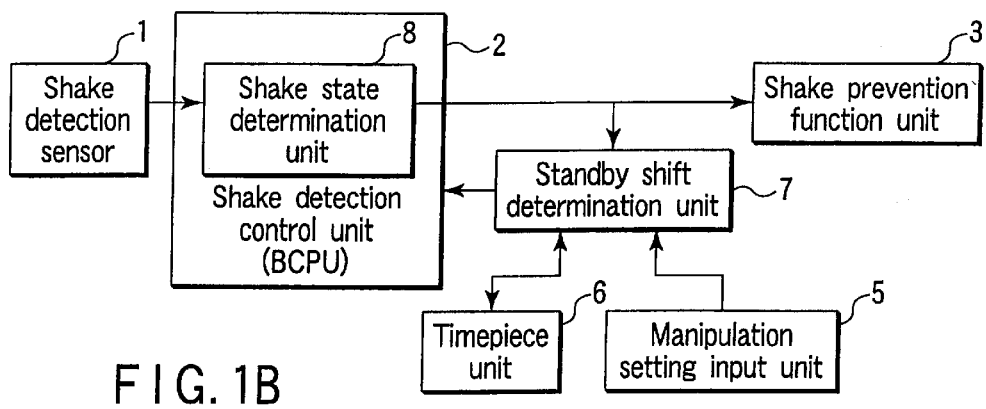
FIG. 1B is a block diagram showing the concept of the photographing apparatus with the shake detection function according to the present invention.
Figure 1C:
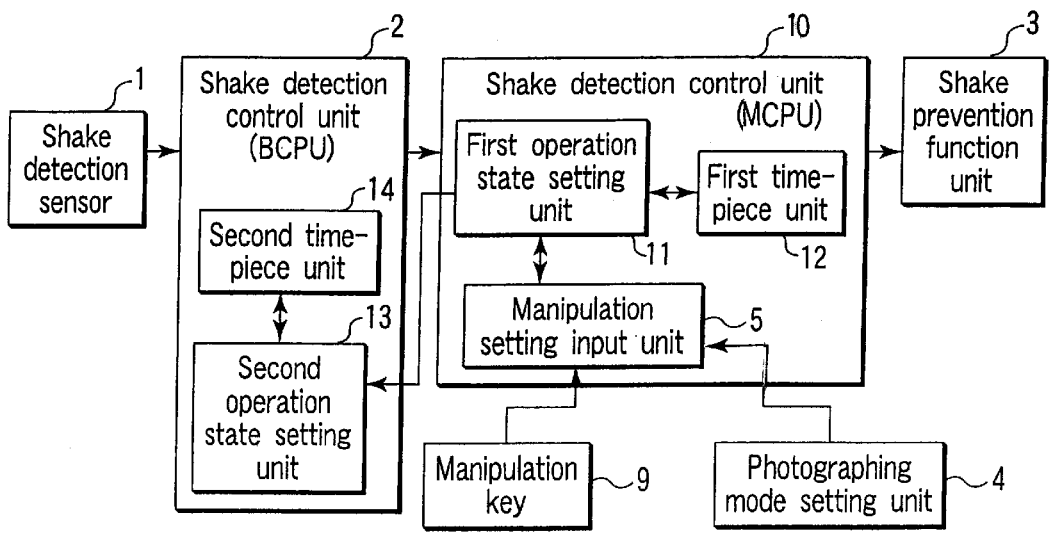
FIG. 1C is a block diagram showing the concept of the photographing apparatus with the shake detection function according to the present invention.

FIGS. 1A to 1C are block diagrams showing the concept of a photographing apparatus with a shake detection function according to the present invention.

In a photographing apparatus with a shake detection function that has an arrangement shown in FIG. 1A, the output of a shake detection sensor 1 is connected to the input of a shake detection control unit (to be referred to as a BCPU hereinafter) 2. The BCPU 2 is connected to a standby shift determination unit 7 and shake prevention function unit 3. The standby shift determination unit 7 is electrically connected to a photographing mode setting unit 4, manipulation setting input unit 5, and timepiece unit 6.

In this arrangement, the shake detection sensor is composed of a vibration gyroscope, angular velocity sensor, and the like. This sensor detects the shake state of the photographing apparatus under the control of the BCPU 2. The shake prevention function unit 3 operates to prevent the shake of the photographing apparatus on the basis of a control output from the BCPU 2. That is, the shake prevention function unit 3 executes, e.g., display of the shake level, and timing control of starting exposure operation when the shake is small. The photographing mode setting unit 4 sets, as a shake mode, photographing operation using the function of the shake prevention function unit 3. The manipulation setting input unit 5 allows the user to input manipulation/setting operation of the photographing apparatus. The timepiece unit 6 measures a time elapsed after input operation of the manipulation setting input unit 5.

The standby shift determination unit 7 determines whether to shift the photographing apparatus to a low-power consumption mode, on the basis of manipulation setting information from the manipulation setting input unit 5 and a timepiece output from the timepiece unit 6. Particularly, the standby shift determination unit 7 changes a time (long/short) used to determine whether to shift the photographing apparatus to the low-power consumption mode, in accordance with a photographing mode state set by the photographing mode setting unit 4.

In a photographing apparatus with a shake detection function that has an arrangement shown in FIG. 1B, the output of the shake detection sensor 1 is connected to the input of a shake state determination unit 8. The output of the shake state determination unit 8 is connected to the inputs of the shake prevention function unit 3 and standby shift determination unit 7. The standby shift determination unit 7 is electrically connected to the BCPU 2, manipulation setting input unit 5, and timepiece unit 6.

In this arrangement, the shake detection sensor 1 detects the shake state of the photographing apparatus. The shake state determination unit 8 determines the shake state from an output from the shake detection sensor 1. The shake prevention function unit 3 performs shake prevention operation for the photographing apparatus on the basis of the determination result of the shake state determination unit 8. For example, the shake prevention function unit 3 executes display of the shake level, and timing control of starting exposure operation when the shake is small. The manipulation setting input unit 5 allows the user of the photographing apparatus to input manipulation/setting operation of the photographing apparatus. The timepiece unit 6 measures a time elapsed after input operation of the manipulation setting input unit 5.

The standby shift determination unit 7 determines whether to shift the photographing apparatus to the low-power consumption mode, on the basis of a timepiece output from the timepiece unit 6. Particularly, the standby shift determination unit 7 changes a time used to determine whether to shift the photographing apparatus to the low-power consumption mode, in accordance with the determination result of the shake state determination unit 8, i.e., the size of the shake state.

In a photographing apparatus with a shake detection function that has an arrangement shown in FIG. 1C, the output of the shake detection sensor 1 is connected to the input of the BCPU 2. The output of the BCPU 2 is connected to the input of a photographing apparatus control unit (to be referred to as an MCPU hereinafter) 10. The output of the MCPU 10 is connected to the input of the shake prevention function unit 3. The BCPU 2 incorporates a second timepiece unit 14 and second operation state setting unit 13.

The MCPU 10 incorporates a first timepiece unit 12, first operation state setting unit 11, and manipulation setting input unit 5. The outputs of the photographing mode setting unit 4 and a manipulation key 9 are connected to the input of the manipulation setting input unit 5.

In this arrangement, the shake detection sensor 1 detects the shake state of the photographing apparatus. The BCPU 2 controls shake detection operation in the shake detection sensor 1. The shake prevention function unit 3 prevents the shake of the photographing apparatus based on a control output from the MCPU 10. The MCPU 10 controls the whole photographing apparatus. The photographing mode setting unit 4 sets, as a photographing mode, photographing operation using the function of the shake prevention function unit 3.

The manipulation key 9 is manipulated for photographing operation of the photographing apparatus. The manipulation setting input unit 5 is incorporated in the MCPU 10 and receives inputs from the photographing mode setting unit 4 and manipulation key 9.

The first timepiece unit 12 is incorporated in the MCPU 10 and measures a time elapsed after input operation of the manipulation setting input unit 5. The first operation state setting unit 11 is incorporated in the MCPU 10. The first operation state setting unit 11 determines whether to shift the photographing apparatus to the low-power consumption mode, on the basis of manipulation setting information from the manipulation setting input unit 5 and a timepiece output from the first timepiece unit 12.

The second operation state setting unit 13 is incorporated in the BCPU 2. The second operation state setting unit 13 determines the operation state of the BCPU 2 on the basis of an instruction from the first operation state setting unit 11. The second timepiece unit 14 is incorporated in the BCPU 2. The second timepiece unit 14 measures a time after the second operation state setting unit 13 receives an instruction from the first operation state setting unit 11.

In particular, the first operation state setting unit 11 determines whether to shift the MCPU 10 to the low-power consumption mode, on the basis of the time measurement result of the first timepiece unit 12. The second operation state setting unit 13 determines whether to shift the BCPU 2 to the low-power consumption mode, on the basis of the time measurement result of the second timepiece unit 14. As a result, the MCPU 10 shifts to the standby state prior to the BCPU 2, and then the BCPU 2 shifts to the standby state.

The first and second times need not always be different as long as the MCPU 10 shifts to the standby state prior to the BCPU 2.

Figure 2:
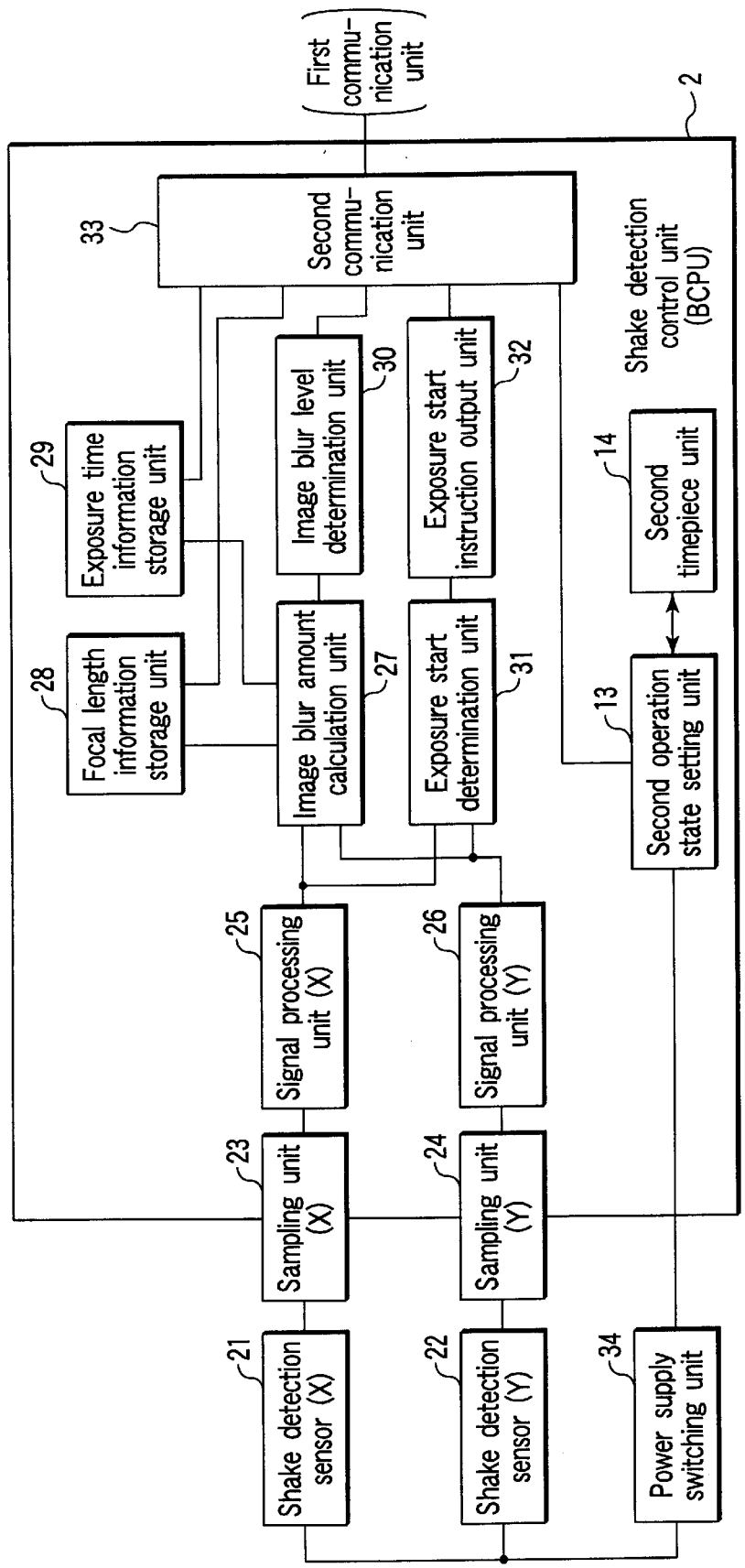
FIG. 2 is a block diagram showing the peripheral arrangement of a BCPU 2 in a photographing apparatus with a shake detection function according to the first embodiment.

FIGS. 2 and 3 are block diagrams showing the arrangement of a photographing apparatus with a shake detection function according to the first embodiment of the present invention. FIG. 2 shows the peripheral arrangement of the BCPU 2 in detail, and FIG. 3 shows the peripheral arrangement of the MCPU 10 in detail.

The peripheral arrangement of the BCPU 2 will be explained with reference to FIG. 2.

In FIG. 2, the output of a shake detection sensor (X) 21 is connected to one input of each of an image blur amount calculation unit 27 and exposure start determination unit 31 via a corresponding one of a sampling unit (X) 23 and signal processing unit (X) 25. Similarly, the output of a shake detection sensor (Y) 22 is connected to the other input of each of the image blur amount calculation unit 27 and exposure start determination unit 31 via a corresponding one of a sampling unit (Y) 24 and signal processing unit (Y) 26.

The image blur amount calculation unit 27 is also connected to a focal length information storage unit 28 and exposure time information storage unit 29. The output of the image blur amount calculation unit 27 is connected to the input of a second communication unit 33 via an image blur level determination unit 30. The output of the exposure start determination unit 31 is connected to the input of the second communication unit 33 via an exposure start instruction output unit 32.

The outputs of the focal length information storage unit 28 and exposure time information storage unit 29 are also connected to the input of the second communication unit 33.

The second communication unit 33 is further connected to the second operation state setting unit 13. The output of the second operation state setting unit 13 is also connected to the second timepiece unit 14 and a power supply switching unit 34. The output of the power supply switching unit 34 is also connected to the shake detection sensor (X) 21 and shake detection sensor (Y) 22.

In this arrangement, a sensor signal from the shake detection sensor (X) 21 is sampled by the sampling unit (X) 23 and subjected to filtering by the signal processing unit (X) 25. The resultant signal is input to the image blur amount calculation unit 27 and exposure start determination unit 31.

Similarly, a sensor signal from the shake detection sensor (Y) 22 is sampled by the sampling unit (Y) 24 and subjected to filtering by the signal processing unit (Y) 26. The resultant signal is input to the image blur amount calculation unit 27 and exposure start determination unit 31.

The image blur amount calculation unit 27 executes image blur amount calculation (vector calculation) on the basis of focal length information from the focal length information storage unit 28 and exposure time information from the exposure time information storage unit 29 in addition to signals obtained via the signal processing units (X) 25 and (Y) 26.

The image blur level determination unit 30 compares the vector calculation result with a predetermined level, determining an image blur level. An output from the image blur level determination unit 30 is sent to the MCPU 10 via the second communication unit 33 and a first communication unit 49.

The exposure start determination unit 31 determines an exposure start timing on the basis of signals obtained via the signal processing units (X) 25 and (Y) 26. Based on the determination result, the exposure start instruction output unit 32 transmits an exposure start instruction signal to the MCPU 10 via the second communication unit 33 and first communication unit 49.

The second timepiece unit 14 counts the second time in a timer. The second operation state setting unit 13 sets the second operation state based on the count of the second timepiece unit 14. Based on this information, the power supply switching unit 34 controls power supply to the shake detection sensors (X) 21 and (Y) 22.

The photographing apparatus can also employ a technique of shifting only the BCPU 2 to the low-power consumption mode while keeping the shake sensors 21 and 22 ON. Upon the lapse of an idle time, the shake sensors 21 and 22 can also be turned off.

The peripheral arrangement of the MCPU 10 will be described with reference to FIG. 3.

In FIG. 3, the second communication unit 33 of the BCPU 2 is connected to the first communication unit 49 of the MCPU 10 to freely communicate with it. The outputs of an AE sensor 44 and film speed detection unit 45 are connected to the input of an exposure time information detection unit 46. The outputs of the exposure time information detection unit 46 and a focal length information detection unit 47 are connected to the input of the first communication unit 49 via a photographing information storage unit 48.

The output of the first communication unit 49 is connected to the inputs of an exposure device 52 and shake state indication unit 51 via a shake prevention function control unit 50. The first communication unit 49 is connected to the first operation state setting unit 11 and manipulation setting input unit 5 to freely communicate with them. The first operation state setting unit 11 is connected to the first timepiece unit 12. The manipulation setting input unit 5 is connected to the photographing mode setting unit 4, a photographing preparation instruction unit (1R) 41, a photographing start instruction unit (2R) 42, the manipulation key 9, and a zoom manipulation unit 43.

The MCPU 10 is connected to an AF sensor 53, flash unit 54, film feed motor 55, focusing lens driving motor 56, zoom motor 57, and stop driving motor 58.

In this arrangement, the exposure time information detection unit 46 detects exposure time information upon reception of an output from the AE sensor 44 and film speed information detected by the film speed detection unit 45. This exposure time information, and focal length information detected by the focal length information detection unit 47, are stored in the photographing information storage unit 48.

The shake prevention function control unit 50 drives and controls the exposure device 52 and shake state indication unit 51 on the basis of information obtained via the first communication unit 49.

The first operation state setting unit 11 sets the first operation state upon reception of an output from the first timepiece unit 12 and an output from the manipulation setting input unit 5.

Output signals from the first operation state setting unit 11 and manipulation setting input unit 5 are sent to the BCPU 2 via the first communication unit 49.

In this way, the photographing apparatus with the shake detection function according to this embodiment calculates an image blur amount on the basis of information of a shake detected by the shake detection sensor, photographing focal length information, and exposure time information. The photographing apparatus performs state discrimination of a generated-shake level and displays the result to warn the photographer.

After photographing start instruction operation (second release ON), whether the state of a generated shake is small is determined based on an output from the shake detection sensor. Photographing operation (exposure operation) starts in a small shake state.

This reduces the "shake" problem in photographing.

The operation of the MCPU 10 in the photographing apparatus with the shake detection function according to the first embodiment will be explained with reference to the flow charts of FIGS. 4A to 4D.

If the MCPU 10 enters this sequence, it initializes various variables and the like (step S1). Subsequently, a flag F_BLMOD is set to 1 as a default setting (step S2). This flag F_BLMOD is set to "1" in a shake mode OFF and to "0" in a shake mode ON.

The MCPU 10 checks whether setting manipulation to the shake mode has been done (step S3). If NO in step S3, the MCPU 10 shifts to step S9; and if YES, it determines whether the shake mode has actually been set (step S4).

If NO in step S4, the flag F_BLMOD is set to 1 (step S7), and the MCPU 10 advances to step S8. If YES in step S4, the flag F_BLMOD is set to 0 (step S5), and the MCPU 10 sends a shake system activation instruction to the BCPU 2 (step S6). In step S8, the standby timer restarts.

Then, the MCPU 10 checks whether key manipulation has been done (step S9). If NO in step S9, the MCPU 10 advances to step S12; and if YES, it performs an operation corresponding to each manipulated key (step S10) The standby timer restarts (step S11), and the MCPU 10 advances to step S12.

The MCPU 10 checks whether the flag F_BLMOD is 0 (step S12). If the flag F_BLMOD is 1 (NO in step S12), the MCPU 10 shifts to step S15. If YES in step S12, the focal length information detection unit 47 detects focal length information, and the exposure time information detection unit 46 detects exposure time information (step S13). These pieces of information are sent to the BCPU 2 (step S14).

The MCPU 10 determines whether the flag F_BLMOD is 0 (step S15). If the flag F_BLMOD is 1, the MCPU 10 checks whether the standby timer exhibits the lapse of a predetermined time B or more (step S18). If NO in step S18, the MCPU 10 shifts to step S26; and if YES, to step S19.

If the flag F_BLMOD is 0 in step S15, the MCPU 10 checks whether the standby timer exhibits the lapse of a predetermined time A or more (step S16). If NO in step S16, the MCPU 10 shifts to step S26; and if YES, it sends a shake system stop instruction to the BCPU 2 (step S17). In this example, the predetermined time A is 2 min, and the predetermined time B is 30 sec. The times A and B, however, are not limited to these values as far as A>B holds.

The MCPU 10 stops the standby timer (step S19), shifts to the standby mode (step S20), and checks whether key manipulation has been done (step S21). The MCPU 10 stands by until key manipulation via the manipulation key 9. After key manipulation, the standby state is canceled (step S22).

The MCPU 10 determines whether the flag F_BLMOD is 0 (step S23). If the flag F_BLMOD is 1 (NO in step S23), the MCPU 10 advances to step S25. If YES in step S23, the MCPU 10 sends a shake system activation instruction to the BCPU 2 (step S24), and starts the standby timer (step S25). Thereafter, the MCPU 10 returns to step S3 to repeat the above-described operation.

If the MCPU 10 shifts to step S26, it determines whether the 1st release is ON (step S26). If YES in step S26, the MCPU 10 stops the standby timer (step S27), and performs AE and AF (steps S28 and S29).

If NO in step S26, the MCPU 10 returns to step S3 to repeat the above operation.

In step S30, the MCPU 10 checks whether the flag F_BLMOD is 0 (step S30). If the flag F_BLMOD is 1 (NO in step S30), the MCPU 10 advances to step S34; and if YES, it sends a shake level information request instruction to the BCPU 2 (step S31). The MCPU 10 receives shake level information from the BCPU 2 (step S32), and performs shake level indication by the shake state indication unit 51 on the basis of the information (step S33). The form of shake level indication will be described later.

The MCPU 10 determines whether the 2nd release is ON (step S34). If NO in step S34, the MCPU 10 checks whether the 1st release is ON (step S35). If NO in step S35, the MCPU 10 returns to step S30 to repeat the above operation. If YES in step S35, the MCPU 10 checks whether the flag F_BLMOD is 0 (step S36).

If the flag F_BLMOD is 1 in step S36 (NO in step S36), the MCPU 10 advances to step S38. If YES in step S36, the MCPU 10 stops shake level indication (step S37), and restarts the standby timer (step S38). Then, the MCPU 10 returns to step S3 to repeat the above operation.

If YES in step S34, the MCPU 10 checks whether the flag F_BLMOD is 0 (step S39). If the flag F_BLMOD is 1 (NO in step S39), the MCPU 10 shifts to step S41. If YES in step S39, the MCPU 10 stops shake level indication by the shake state indication unit 51 (step S40). After that, the MCPU 10 executes mirror-up operation (step S41) and stopping-down operation (step S42).

The MCPU 10 checks whether mirror/stop operation has been completed (step S43). If YES in step S43, the MCPU 10 determines whether the flag F_BLMOD is 0 (step S44). If the flag F_BLMOD is 1 (NO in step S44), the MCPU 10 shifts to step S51; and if YES, to processing in step S45 and subsequent steps.

In step S45, the MCPU 10 sends an exposure start determination instruction to the BCPU 2, and starts the delay timer (step S46).

If the MCPU 10 receives an exposure start signal from the BCPU 2 (step S47), it determines whether the signal is an exposure start signal (step S48). If NO in step S48, the MCPU 10 checks whether the delay timer exhibits the lapse of a predetermined time (step S49). If NO in step S49, the MCPU 10 returns to step S47; and if YES, it stops the delay timer in step S50.

Then, exposure by the exposure device 52 starts (S51), and the MCPU 10 checks whether a proper exposure time has elapsed (step S52). If YES in step S52, exposure ends (step S53).

After that, mirror-down operation and full-aperture operation are done (steps S54 and S55). The shutter is charged (step S56), and the film is wound up (step S57).

If the 2nd and 1st releases are both turned on (steps S58 and S59), the standby timer restarts (S60), and the MCPU 10 returns to step S3.

Figure 10A:
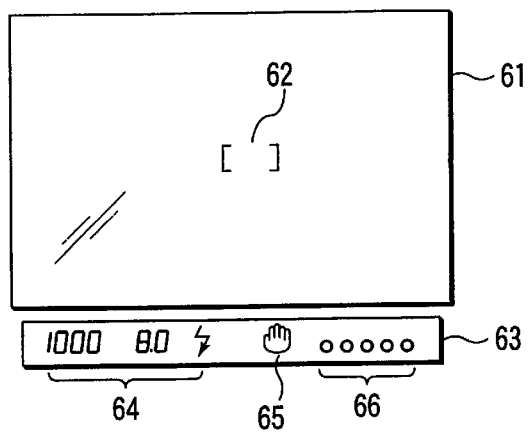
FIG. 10A is a view showing the form of shake level indication display.
Figure 10B:
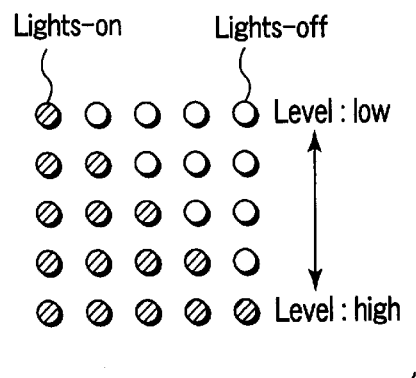
FIG. 10B is a view showing the form of shake level indication display.
Figure 10C:
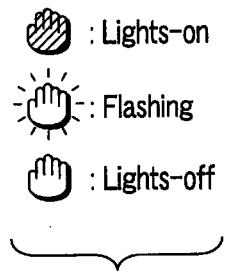
FIG. 10C is a view showing the form of shake level indication display.

The form of the shake level indication display is shown in FIGS. 10A to 10C. As shown in FIG. 10A, a distance measurement point 62 is set at the center of a photographing screen frame 61. A photographing information display 63 is attached below the photographing screen frame 61. The photographing information display 63 includes a photographing condition display portion 64, shake reduction mode display portion 65, and shake level information display portion 66.

As shown in FIG. 10B, the shake level information display portion 66 increases the number of lights for a higher shake level. Further, as shown in FIG. 10C, the shake reduction mode display portion 65 is changed to represent whether the mode has been set.

The operation on the BCPU 2 side in the photographing apparatus with the shake detection function according to the first embodiment will be described in detail with reference to the flow charts of FIGS. 5A and 5B.

In this sequence, after the BCPU 2 performs initialization (step S101), it changes to a STOP state (step S102), and communication line check is executed (step S103). Then, whether a system activation instruction from the MCPU 10 exists is checked (step S104). If NO in step S104, the flow returns to step S102.

If YES in step S104, the BCPU 2 changes to a RUN state (step S105). The shake system is activated (step S106), and the shake detection system is initialized (step S107). The sampling timer starts (step S108), and communication line check is done again (step S109).

The BCPU 2 determines whether a shake system stop instruction exists (step S110). If YES in step S110, the shake system stops (step Sill), the BCPU 2 stops (step S112), and the flow returns to step S102. If NO in step S110, the BCPU 2 checks whether focal length information and exposure time information have been transmitted (step S113). If YES in step S113, these pieces of information are stored (step S114), and the flow returns to step S109.

Figure 11:
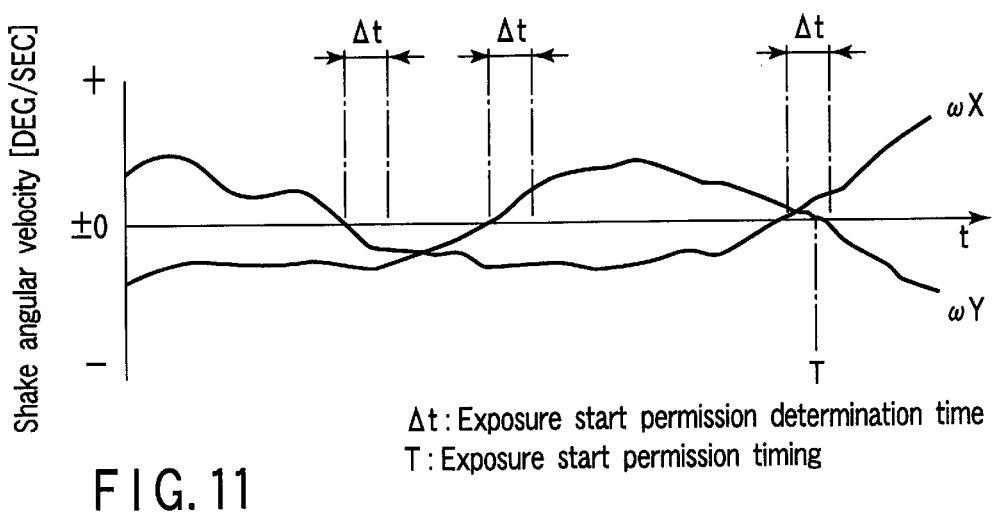
FIG. 11 is a graph for explaining in detail exposure start determination.

If NO in step S113, whether an exposure start determination instruction exists is checked (step S115). If YES in step S115, a subroutine "shake detection" (to be described in detail later) is executed (step S116). Shake prediction calculation is done by a technique disclosed in Jpn. Pat. Appln. KOKAI Publication No. 5-204012 (step S117). Exposure start determination is performed by a technique disclosed in Jpn. Pat. Appln. KOKAI Publication No. 10-48681 (step S118). Then, whether an exposure start signal is to be output is determined (step S119). In step S118, exposure start determination is executed based on the relationship shown in FIG. 11. In FIG. 11, the ordinate represents the shake angular velocity [DEG/SEC], and the abscissa represents time. In FIG. 11, $\Delta t$ represents the exposure start permission determination time, and T is the exposure start permission timing.

If necessary, an exposure start signal is output (step S120), and the flow returns to step S109.

If NO in step S115, whether a shake level information transmission instruction exists is checked (step S121). If NO in step S121, the subroutine "shake detection" (to be described in detail later) is executed (step S127), and the flow returns to step S109.

If YES in step S121, the subroutine "shake detection" (to be described in detail later) is executed (step S122). Focal length information and exposure time information are read (step S123), and the image blur amount is calculated (step S124). The shake level is determined (step S125), shake level information is output (step S126), and the flow returns to step S109.

Figure 6:
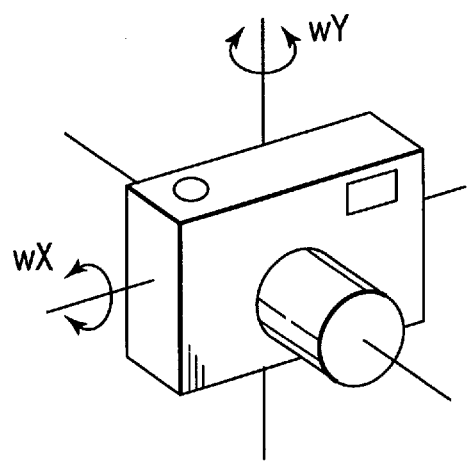
FIG. 6 is a view for explaining in detail calculation of the image blur amount.

In step S124, as shown in FIG. 6, a shake amount $\Delta x$ of the film surface in the x direction is calculated by wy·f·SS for image blur amounts wx and wy. A shake amount $\Delta y$ of the film surface in the y direction is calculated by wx·f·SS. A vector amount by x and y is obtained by the square root of the sum of the square of $\Delta x$ and the square of $\Delta y$.

Figure 7:
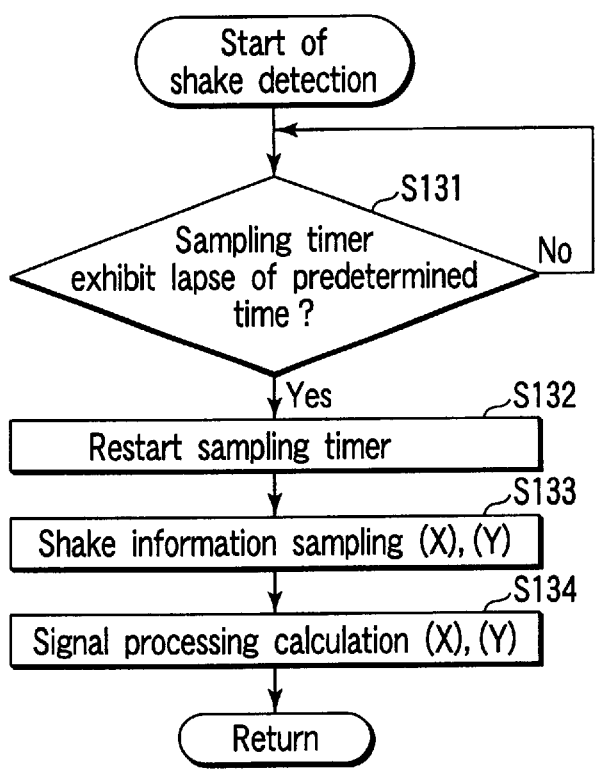
FIG. 7 is a flow chart for explaining in detail the operation of a subroutine "shake detection"

The operation of the subroutine "shake detection" will be explained in detail with reference to the flow chart of FIG. 7.

If the flow enters this subroutine, whether the sampling timer exhibits the lapse of a predetermined time (e.g., 1 to 2 msec) is checked. If the predetermined time has elapsed (YES in step S131), the sampling timer restarts (step S132). Shake information is sampled (step S133), predetermined signal processing operations (X) and (Y) are performed (step S134), and then the flow returns.

In the first embodiment, a time until the shift of the photographing apparatus to the standby state is prolonged when a photographing mode using the above mentioned shake reduction function is selected. This method is adopted to avoid a failure in accurate shake detection operation as much as possible during the stabilization time of the shake detection sensor output and shake detection system, and to prevent continuous current consumption during shake detection operation.

The second embodiment of the present invention will be described.

The basic arrangement is the same as that in the first embodiment (FIGS. 2 and 3). The same reference numerals as described above denote the same parts, and only a characteristic operation will be explained.

Figure 8:
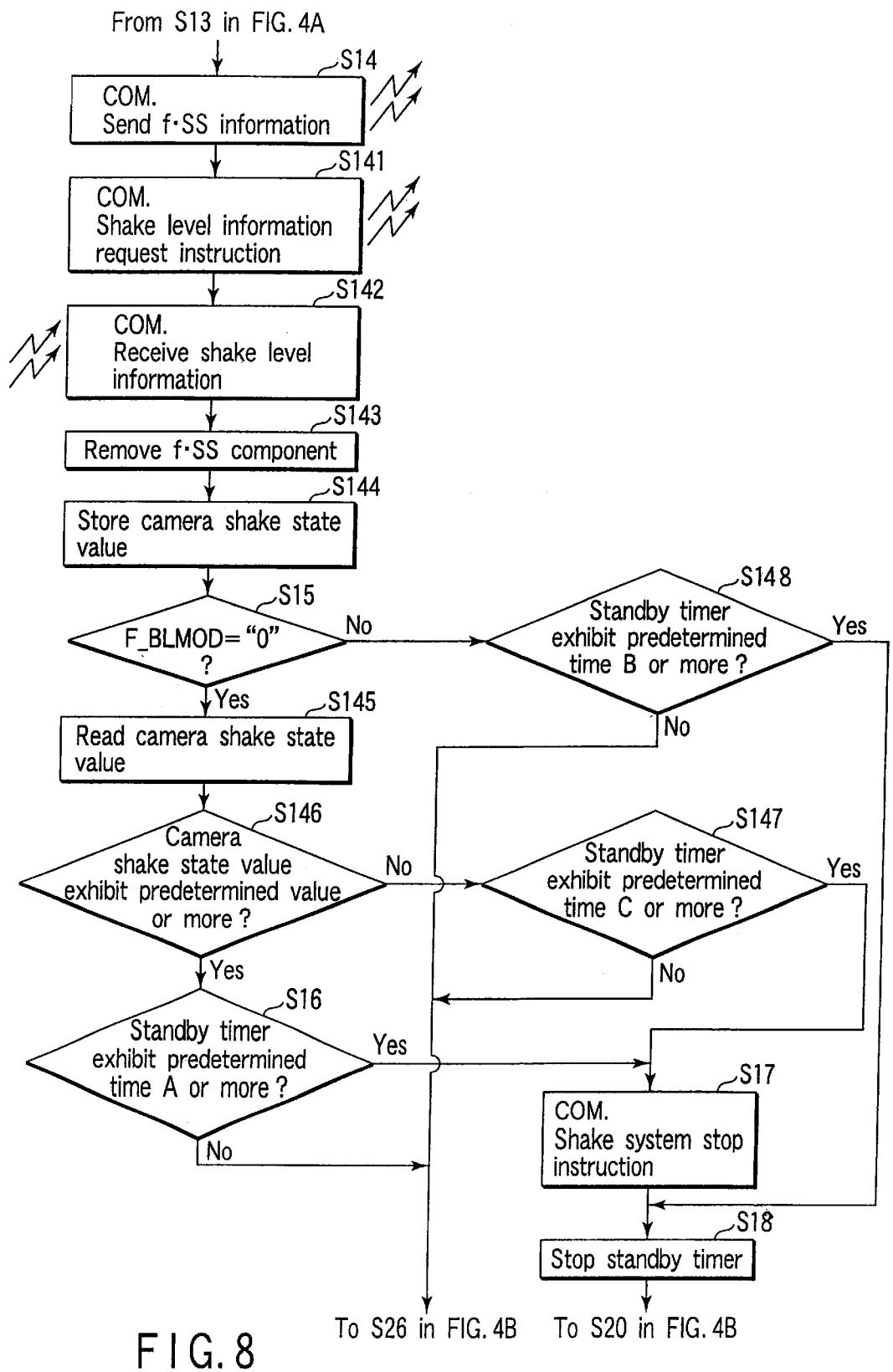
FIG. 8 is a flow chart for explaining in detail the operation of a photographing apparatus with a shake detection function according to the second embodiment.

The operation of a photographing apparatus with a shake detection function according to the second embodiment will be described in detail with reference to the flow chart of FIG. 8.

The same reference numerals as in FIGS. 4A to 4D denote the same processes, and a description thereof will be omitted. Different processes will be mainly explained.

Figure 4A:
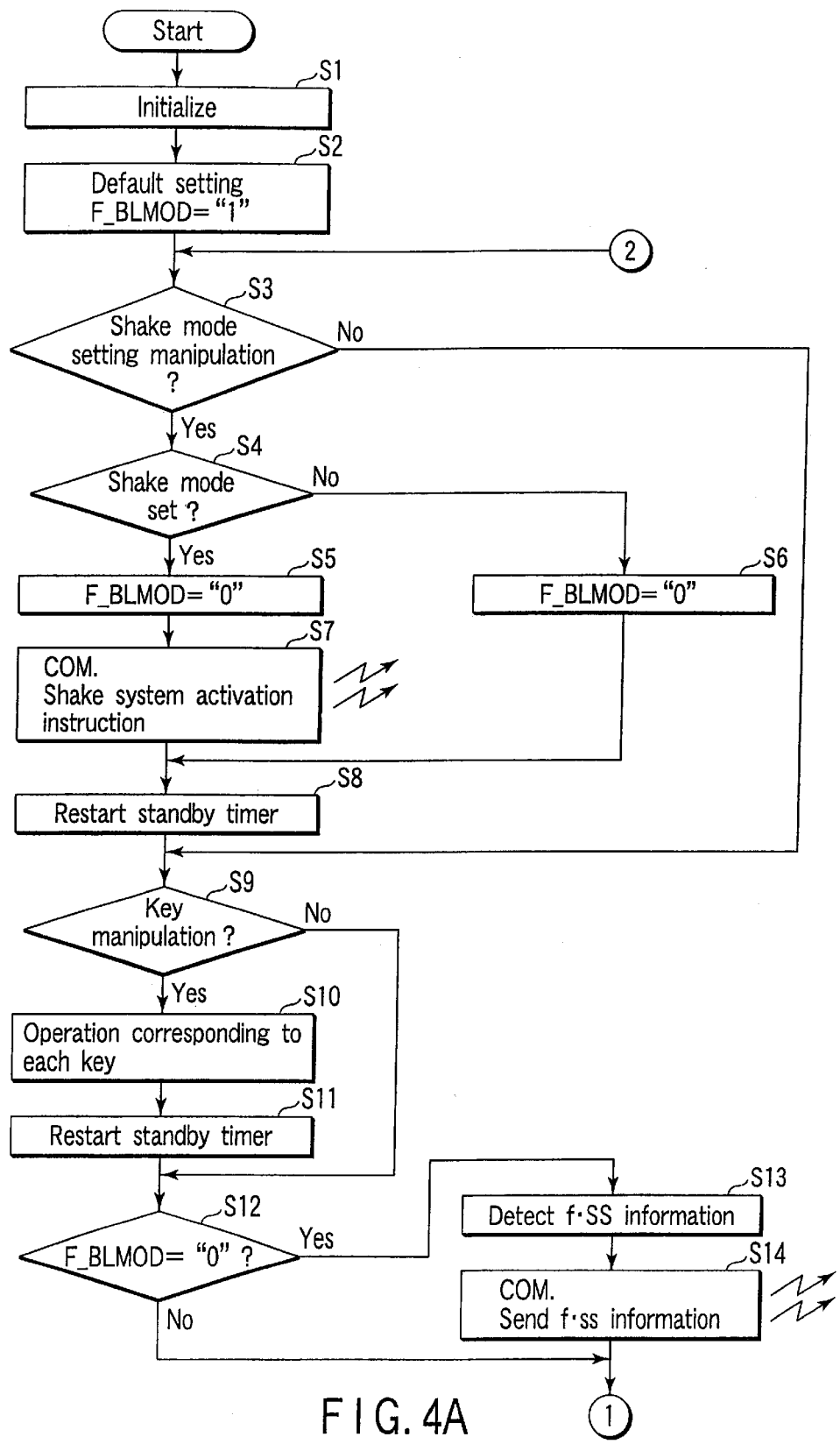
FIG. 4A is a flow chart for explaining the operation of the MCPU 10 in the photographing apparatus with the shake detection function according to the first embodiment.

After the same processing as in FIG. 4A is performed up to step S14, an MCPU 10 sends a shake level information request instruction to a BCPU 2 (step S141). The MCPU 10 receives shake level information from the BCPU 2 (step S142), removes focal length information and exposure time information (step S143), and stores a camera shake state value (step S144).

The MCPU 10 determines whether a flag F_BLMOD is 0 (step S15). If the flag F_BLMOD is 1 (NO in step S15), the MCPU 10 checks whether the standby timer exhibits a predetermined time B or more (step S148). If YES in step S148, the MCPU 10 advances to step S18; and if NO, it executes the same processing as that in step S26 and subsequent steps in FIG. 4B.

If YES in step S15, the MCPU 10 reads a camera shake state value (step S145), and checks whether the camera shake state value is a predetermined value or more (step S146). If YES in step S146 (large shake), the MCPU 10 determines whether the standby timer exhibits a predetermined time A or more (step S16). If YES in step S16, the MCPU 10 advances to step S17; and if NO, it executes the same processing as that in step S26 and subsequent steps in FIG. 4B.

If NO in step S146 (small shake), the MCPU 10 checks whether the standby timer exhibits a predetermined time C or more (step S147). If YES in step S147, the MCPU 10 shifts to step S17; and if NO, it executes the same processing as that in step S26 and subsequent steps in FIG. 4B.

Figure 4B:
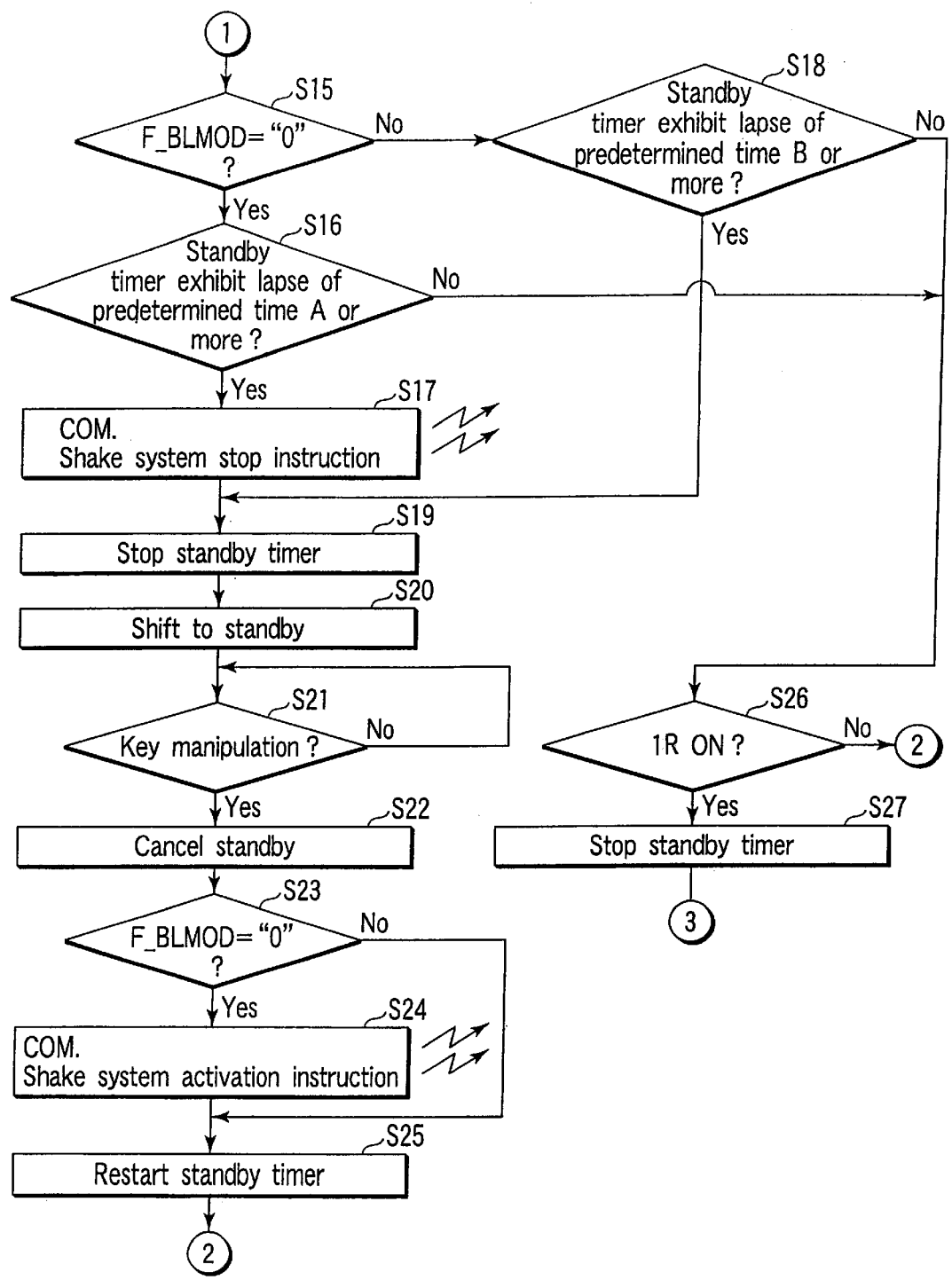
FIG. 4B is a flow chart for explaining the operation of the MCPU 10 in the photographing apparatus with the shake detection function according to the first embodiment.
Figure 4C:
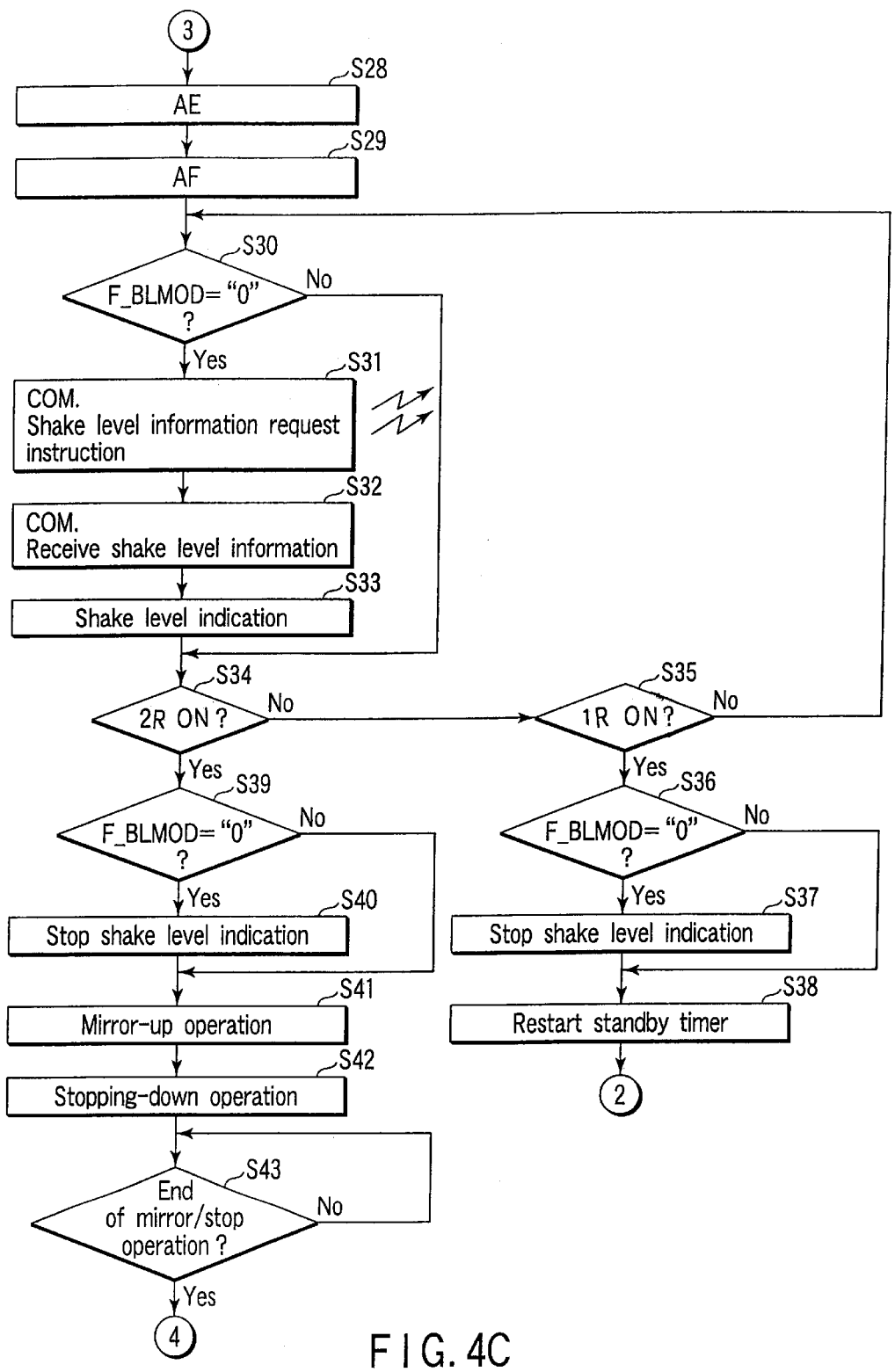
FIG. 4C is a flow chart for explaining the operation of the MCPU 10 in the photographing apparatus with the shake detection function according to the first embodiment.
Figure 4D:
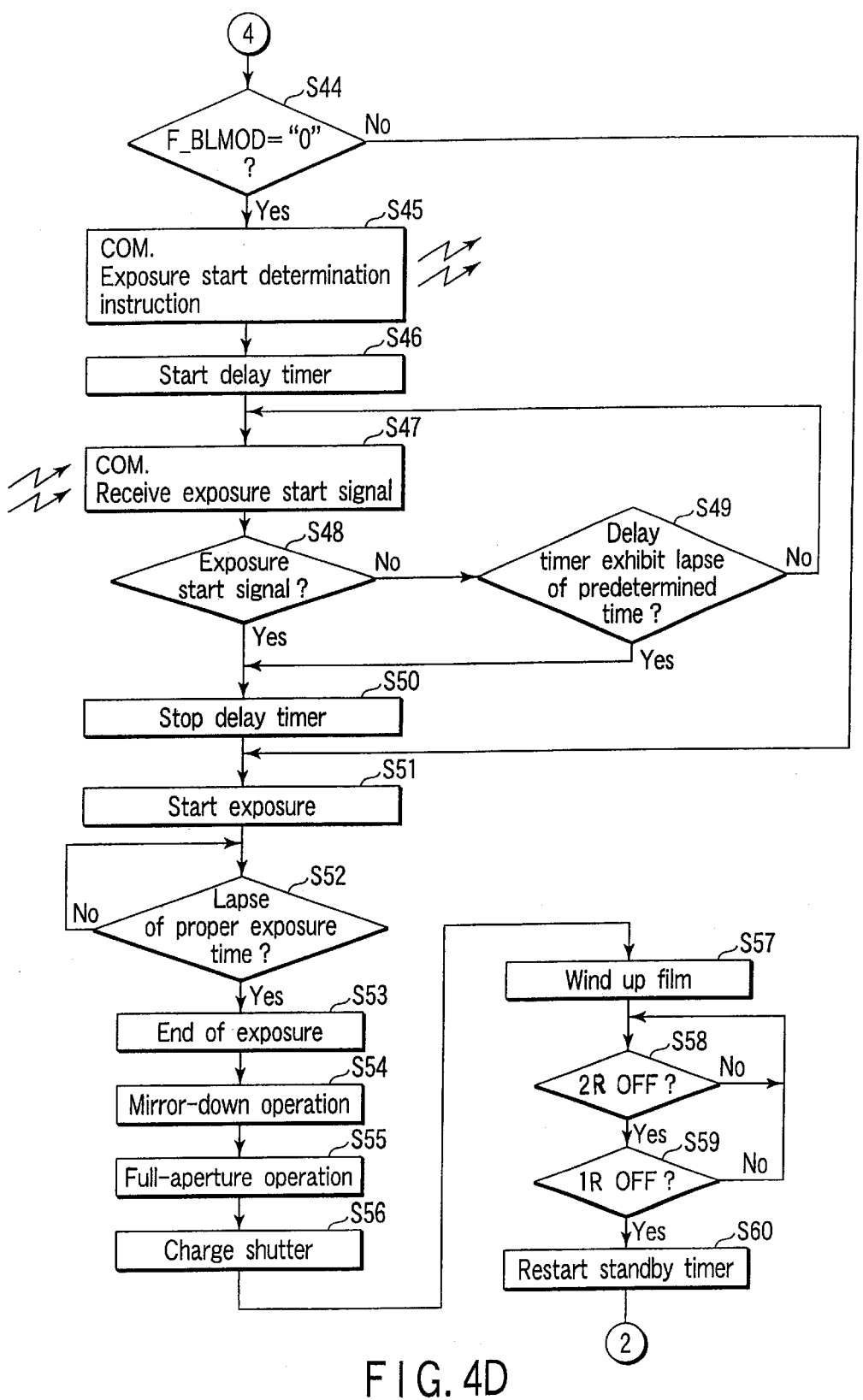
FIG. 4D is a flow chart for explaining the operation of the MCPU 10 in the photographing apparatus with the shake detection function according to the first embodiment.

After that, the MCPU 10 sends a shake system stop instruction (step S17), stops the standby timer (step S18), and executes the same processing as that in step S20 and subsequent steps in FIG. 4B.

In the second embodiment, the photographing apparatus is predicted to be in non-use for a small shake. The time until the shift to the standby state is set shorter than the normal time.

The third embodiment of the present invention will be described.

The basic arrangement is the same as that in the first embodiment (FIGS. 2 and 3). The same reference numerals as described above denote the same parts, and only a characteristic operation will be explained.

Figure 9A:
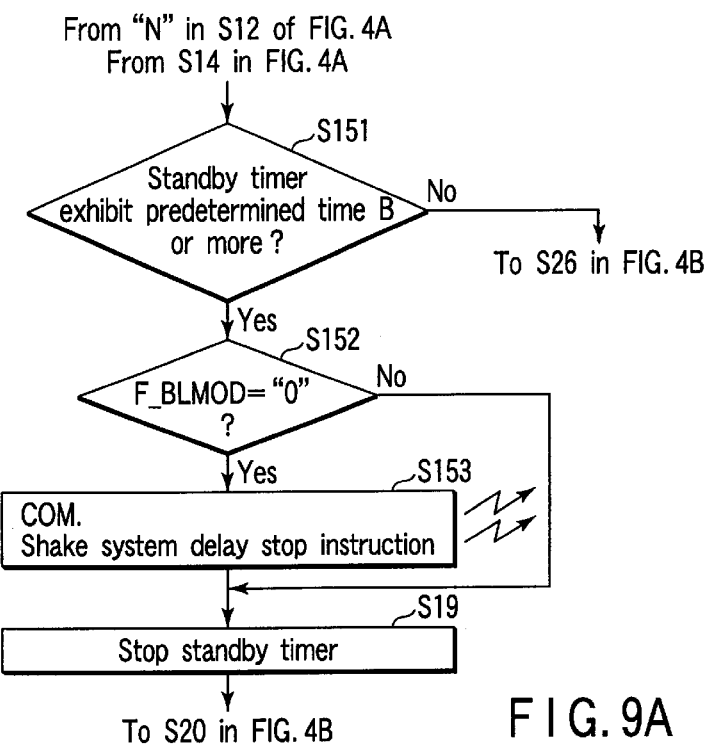
FIG. 9A is a flow chart for explaining in detail the operation of a photographing apparatus with a shake detection function according to the third embodiment.

The processing of an MCPU in a photographing apparatus with a shake detection function according to the third embodiment will be explained in detail with reference to the flow chart of FIG. 9A.

The same reference numerals as in FIGS. 4A to 4D denote the same processes, and a description thereof will be omitted. Different processes will be mainly explained.

If the same determination as in step S12 of FIG. 4A is executed and the flow branches to "N", or after the same processing as that in step S14, an MCPU 10 checks whether the standby timer exhibits a predetermined time B or more (step S151). If NO in step S151, the MCPU 10 performs the same processing as that in step S26 of FIG. 4B.

If YES in step S151, the MCPU 10 checks whether the flag F_BLMOD is 0 (step S152). If YES in step S152, the MCPU 10 sends a shake system delay stop instruction (step S153), and advances to processing in step S19 and subsequent steps.

Figure 9B:
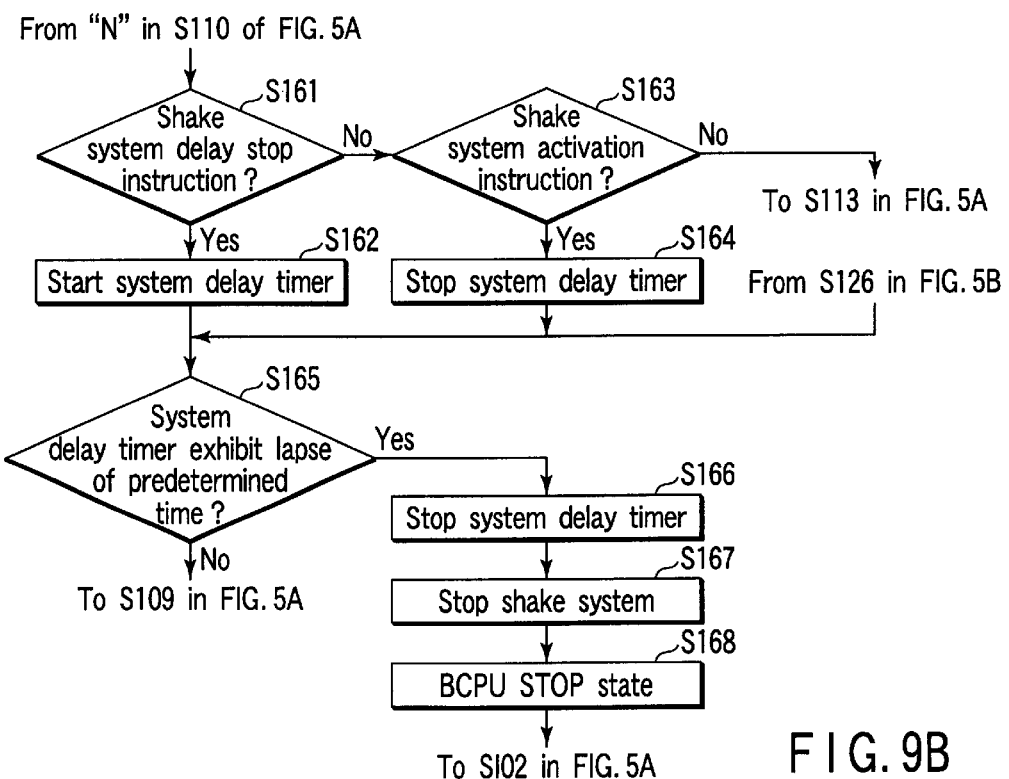
FIG. 9B is a flow chart for explaining in detail the operation of the photographing apparatus with the shake detection function according to the third embodiment.

The processing of a BCPU 2 in the photographing apparatus with the shake detection function according to the third embodiment will be explained in detail with reference to the flow chart of FIG. 9B.

Figure 5A:
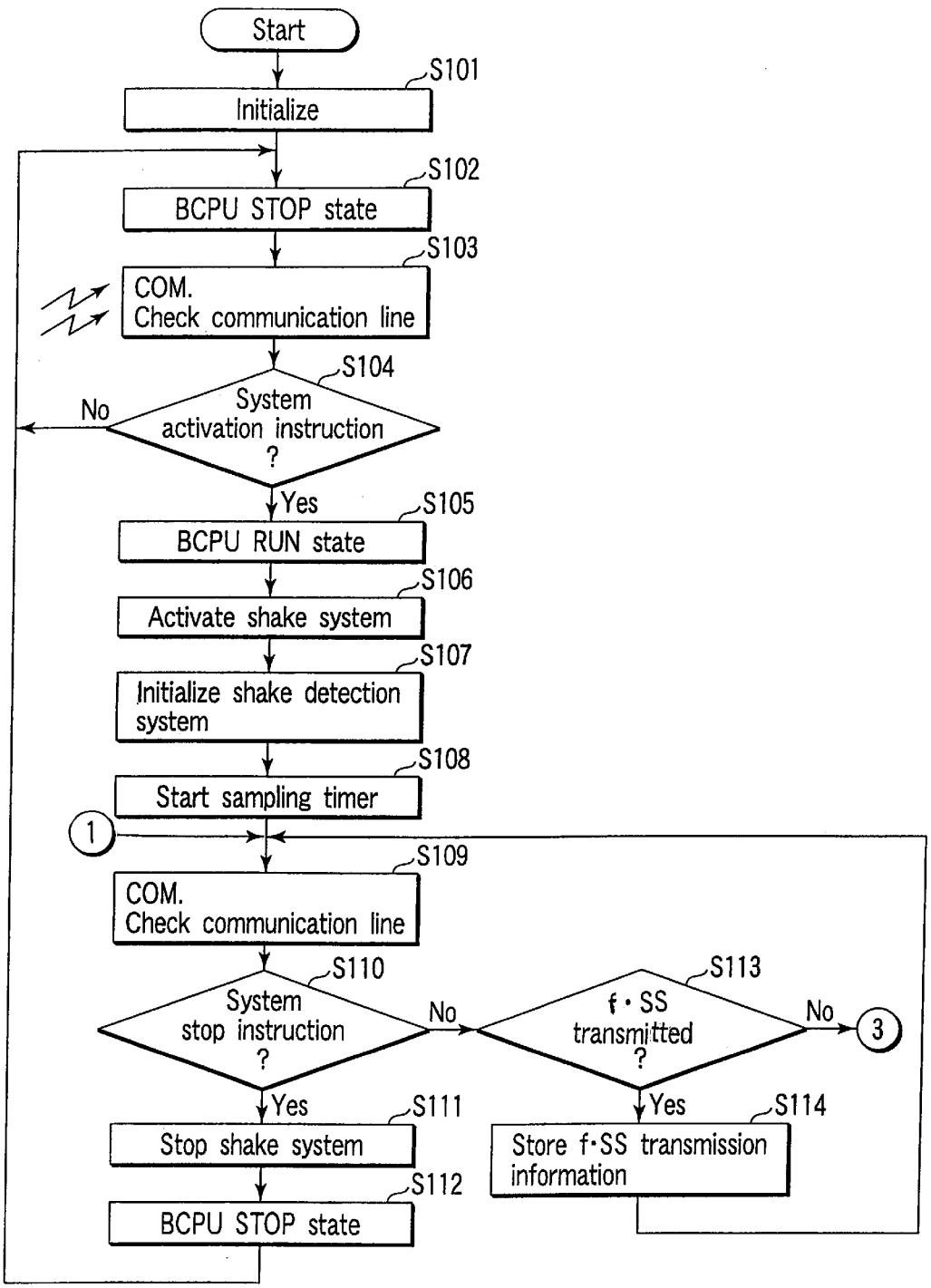
FIG. 5A is a flow chart for explaining in detail the operation on the BCPU 2 side in the photographing apparatus with the shake detection function according to the first embodiment.
Figure 5B:
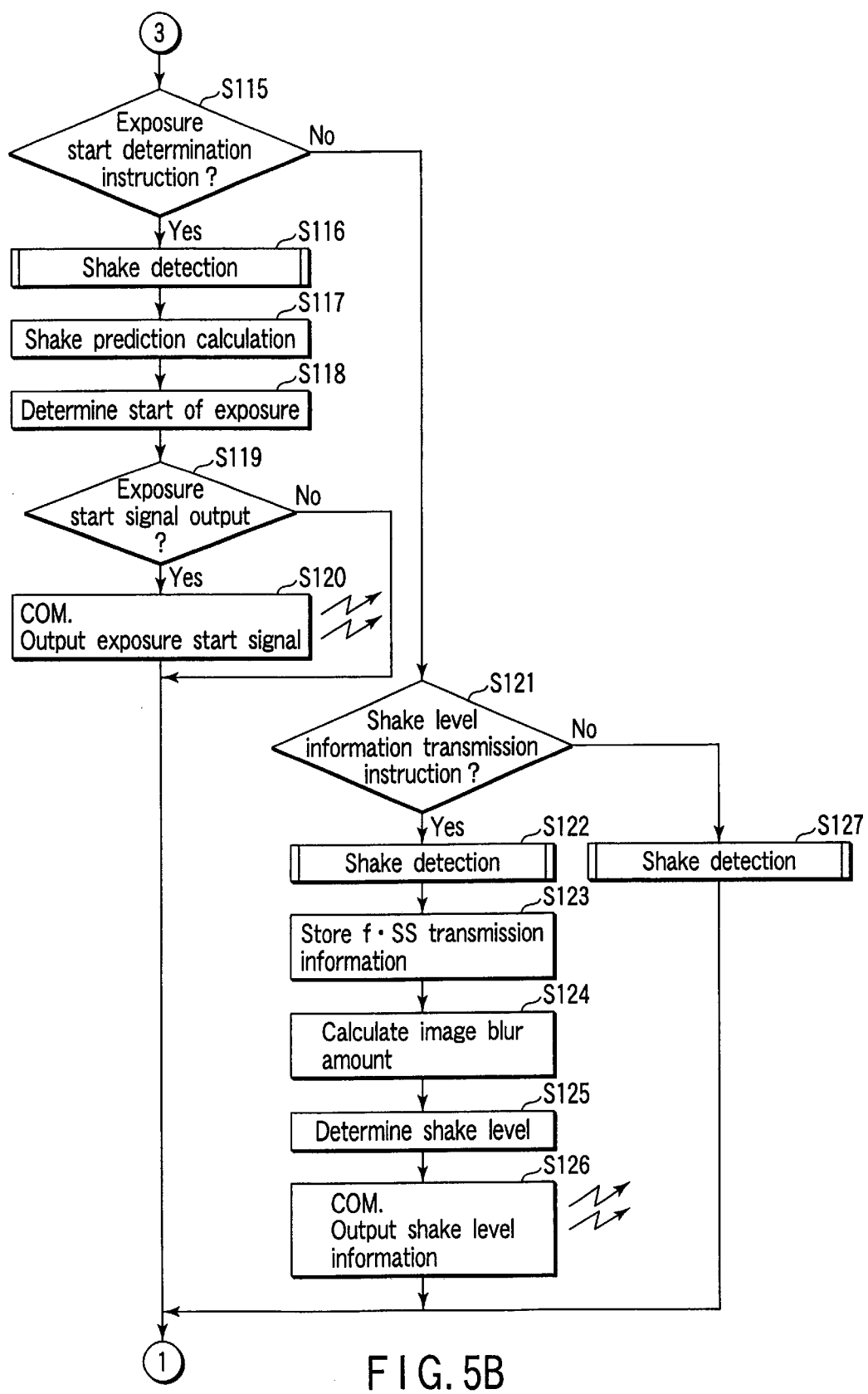
FIG. 5B is a flow chart for explaining in detail the operation on the BCPU 2 side in the photographing apparatus with the shake detection function according to the first embodiment.

The same reference numerals as in FIGS. 5A and 5B denote the same processes, and a description thereof will be omitted. Different processes will be mainly explained.

If the same determination as in step S110 of FIG. 5A is executed and the flow branches to "N", the BCPU 2 checks whether a shake system delay stop instruction exists (step S161). If YES in step S161, the BCPU 2 starts the system delay timer (step S162), and determines whether the system delay timer exhibits the lapse of a predetermined time (step S165). If YES in step S165, the BCPU 2 stops the system delay timer (step S166), and stops the shake system (step S167). Then, the BCPU 2 is stopped (step S168), and the same processing as in step S102 of FIG. 5A is done.

If NO in step S161, the BCPU 2 checks whether a shake system activation instruction exists (step S163). If NO in step S163, the BCPU 2 executes the same processing as in step S113 of FIG. 5A. If YES in step S163, the BCPU 2 stops the system delay timer (step S164), and shifts to step S165.

In the third embodiment, a difference is set between a time until the shift of the BCPU 2 to the standby state and a time until the shift of the MCPU 10 other than the BCPU 2 to the standby state. The time until the shift of the BCPU 2 to the standby state (CPU: STOP state) is set longer than the time until the shift of the MCPU to the standby state.

Note that the photographing apparatus may employ a method of shifting the BCPU to the sleep state by such terminal settings that energization to the shake sensor becomes ON, and stopping feed to the shake sensor itself upon the lapse of a predetermined time.

As has been described above, according to the present invention, the time until the shift of the photographing apparatus to the standby state is set longer than the normal time in the shake reduction mode in a photographing apparatus with a shake reduction function. This can implement a shake detection function which can cope with an instantaneous operation such as press down operation at one fling. Further, the present invention changes the standby shift time in accordance with the shake state at that time. Since the photographing apparatus must be still for a small shake, the time until the shift to the standby state is set shorter than the normal time. This can suppress current consumption when the photographing apparatus is not used.

The present invention can provide a photographing apparatus with a shake detection function that can instantaneously execute shake detection operation while suppressing current consumption in non-use.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A photographing apparatus with a shake detection function, comprising:
    a shake detection unit configured to detecting a shake state of the photographing apparatus;
    a shake detection control unit configured to controlling shake detection operation in said shake detection unit;
    a shake prevention function unit configured to preventing a shake of the photographing apparatus on the basis of a control output from said shake detection control unit;
    a photographing mode setting unit configured to setting a first photographing mode that uses a function of said shake prevention function unit and a second photographing mode that does not use the function of said shake prevention function unit;
    a manipulation unit which is manipulated by a user of the photographing apparatus;
    a timepiece unit configured to measuring a time elapsed after said manipulation unit is manipulated; and
    a standby shift unit configured to shifting the photographing apparatus to a low-power consumption state on the basis of a timepiece output from said timepiece unit, said standby shift unit changing a time until shift to the low-power consumption state in accordance with a photographing mode set by said photographing mode setting unit.

2. An apparatus according to claim 1, wherein a shift time to the low-power consumption state in the first photographing mode is longer than a shift time in the second photographing mode.

3. The photographing apparatus of claim 2 wherein the shift time in the first photographing mode is finite.

4. An apparatus according to claim 1, wherein said shake prevention function unit indicates a shake state level on the basis of an output from said shake detection unit.

5. An apparatus according to claim 1, wherein said shake prevention function unit permits photographing operation when a shake generated in the photographing apparatus is not larger than a predetermined level.

6. The photographing apparatus of claim 1 wherein the time until shift to the low-power state is finite.

7. A photographing apparatus with a shake detection function, comprising:
  a shake detection unit configured to detecting a shake state of the photographing apparatus;
  a shake state determination unit configured to determining the shake state of the photographing apparatus on the basis of an output from said shake detection unit;
  a manipulation unit which is manipulated by a user of the photographing apparatus;
  a timepiece unit configured to measuring a time elapsed after said manipulation unit is manipulated; and
  a standby shift unit configured to shifting the photographing apparatus to a low-power consumption mode on the basis of a timepiece output from said timepiece unit, said standby shift unit changing a time until shift of the photographing apparatus to the low-power consumption mode in accordance with a determination result of said shake state determination unit.

8. The photographing apparatus of claim 7 wherein the time until shift of the photographing apparatus to the low-power consumption mode is finite.

9. A photographing apparatus with a shake detection function, comprising:
  shake detection means for detecting a shake state of the photographing apparatus;
  shake prevention means for preventing a shake of the photographing apparatus on the basis of an output from said shake detection means;
  photographing mode setting means capable of setting a first photographing mode in which said shake prevention means is operated, and a second photographing mode in which said shake prevention means is not operated;
  manipulation means which is manipulated by a user of the photographing apparatus; and
  standby shift means for shifting the photographing apparatus to a low-power consumption mode a predetermined time after said manipulation means is manipulated;
  wherein the predetermined time is changed in accordance with a photographing mode set by said photographing mode setting means, and a time in the first photographing mode is longer than a time in the second photographing mode.

10. The photographing apparatus of claim 9 wherein the predetermined time is finite.

11. A photographing apparatus with a shake detection function, comprising:
  a shake detection means for detecting a shake state of the photographing apparatus;
  shake detection control means for controlling shake detection operation in said shake detection means;
  shake prevention means for preventing a shake of the photographing apparatus on the basis of a control output from said shake detection control means;
  photographing apparatus control means for controlling the whole photographing apparatus;
  photographing mode setting means for setting a photographing mode in which photographing operation using a function of said shake prevention means is performed;
  a manipulation key for being manipulated to perform photographing operation in the photographing apparatus;
  manipulation setting input means, incorporated in said photographing apparatus control means, for receiving inputs from said photographing mode setting means and said manipulation key;
  first timepiece means, incorporated in said photographing apparatus control means, for measuring a time elapsed after input manipulation via said manipulation setting input means;
  first operation state setting means, incorporated in said photographing apparatus control means, for determining whether to shift the photographing apparatus to a low-power consumption mode on the basis of manipulation setting information from said manipulation setting input means and a timepiece output from said first timepiece means;
  second operation state setting means, incorporated in said shake detection control means, for determining an operation state of said shake detection control means on the basis of an instruction from said first operation state setting means; and
  second timepiece means, incorporated in said shake detection control means, for measuring a time after said second operation state setting means receives the instruction from said first operation state setting means;
  wherein said first operation state setting means determines whether to shift said photographing apparatus control means to the low-power consumption mode on the basis of a timepiece result of said first timepiece means, and said second operation state setting means determines whether to shift said shake detection control means to the low-power consumption mode on the basis of a timepiece result of said second timepiece means.

12. An apparatus according to claim 11, wherein said second operation state setting means shifts said shake detection control means to the low-power consumption mode after at least said first operation setting means shifts said photographing apparatus control means to the low-power consumption mode.

13. A photographing apparatus with a shake detection function, comprising:
  a shake detection means for detecting a shake state of the photographing apparatus;
  shake detection control means for controlling shake detection operation in said shake detection means;
  shake prevention means for preventing a shake of the photographing apparatus on the basis of a control output from said shake detection control means;
  photographing apparatus control means for controlling the whole photographing apparatus;
  photographing mode setting means for setting a photographing mode in which photographing operation using a function of said shake prevention means is performed;
  a manipulation key for being manipulated to perform photographing operation in the photographing apparatus;
  manipulation setting input means, incorporated in said photographing apparatus control means, for receiving inputs from said photographing mode setting means and said manipulation key;
  first timepiece means, incorporated in said photographing apparatus control means, for measuring a time elapsed after input manipulation via said manipulation setting input means;

first operation state setting means, incorporated in said photographing apparatus control means, for determining whether to shift the photographing apparatus to a low-power consumption mode on the basis of manipulation setting information from said manipulation setting input means and a timepiece output from said first timepiece means;

second operation state setting means, incorporated in said shake detection control means, for determining an operation state of said shake detection control means on the basis of an instruction from said first operation state setting means; and second timepiece means, incorporated in said shake detection control means, for measuring a time after said second operation state setting means receives the instruction from said first operation state setting means;

wherein said first operation state setting means determines whether to shift said photographing apparatus control means to the low-power consumption mode on the basis of a timepiece result of said first timepiece means, and said second operation state setting means determines whether to stop said shake detection sensor on the basis of a timepiece result of said second timepiece means.

14. An apparatus according to claim 13, wherein said second operation state setting means shifts said shake detection control means to the low-power consumption mode after at least said first operation setting means shifts said photographing apparatus control means to the low-power consumption mode.

* * * * *